United States Patent [19]

Wood

[11] Patent Number: 4,603,551
[45] Date of Patent: Aug. 5, 1986

[54] WAVE POWER CONVERTER

[76] Inventor: Peter Wood, 5 Budworth Close, Birkenhead, Merseyside, L43 9TJ, United Kingdom

[21] Appl. No.: 637,047
[22] PCT Filed: Nov. 29, 1983
[86] PCT No.: PCT/GB83/00307
  § 371 Date: Jul. 25, 1984
  § 102(e) Date: Jul. 25, 1984
[87] PCT Pub. No.: WO84/02162
  PCT Pub. Date: Jun. 7, 1984

[30] Foreign Application Priority Data

Nov. 29, 1982 [GB] United Kingdom ............ 8233949

[51] Int. Cl.⁴ .................................................. F03B 13/12
[52] U.S. Cl. .................................. 60/496; 60/497; 60/498; 60/501; 417/333
[58] Field of Search ............ 417/331, 330, 333, 543; 60/496, 497, 498, 501; 137/207

[56] References Cited

U.S. PATENT DOCUMENTS

| | | | |
|---|---|---|---|
| 1,459,775 | 6/1923 | Larner | 137/207 |
| 3,515,889 | 6/1970 | Kammerer | 290/53 |
| 3,569,725 | 3/1971 | Rosenberg | 417/333 X |
| 4,076,463 | 2/1978 | Welczer | 417/331 |
| 4,078,388 | 3/1978 | Atencio | 290/53 X |
| 4,091,618 | 5/1978 | Jackson | 417/333 X |
| 4,421,461 | 12/1983 | Hicks et al. | 417/331 X |
| 4,480,966 | 11/1984 | Smith | 417/332 |

FOREIGN PATENT DOCUMENTS 2365197 7/1975 Fed. Rep. of Germany .
2068469 8/1981 United Kingdom .

*Primary Examiner*—Richard E. Gluck
*Attorney, Agent, or Firm*—Griffin, Branigan, & Butler

[57] ABSTRACT

A relatively lightweight 'motivator buoy' (15), constrained by guides (93) attached to a ballasted "floating platform" (1) of contrasting and static buoyancy characteristics, reciprocates vertically by wave action, lifting water via a piston (20) and cylinder (4) through automatic non-return valves (21,22) into a pressurized storage compartment (23) incorporating a compressible medium such as an airspace, then turning a water turbine (10) and electricity generator (11), or alternatively providing a hydraulic power source for other uses. Modules so constructed may be linked by an above-water framework to form continuous arrays.

15 Claims, 11 Drawing Figures

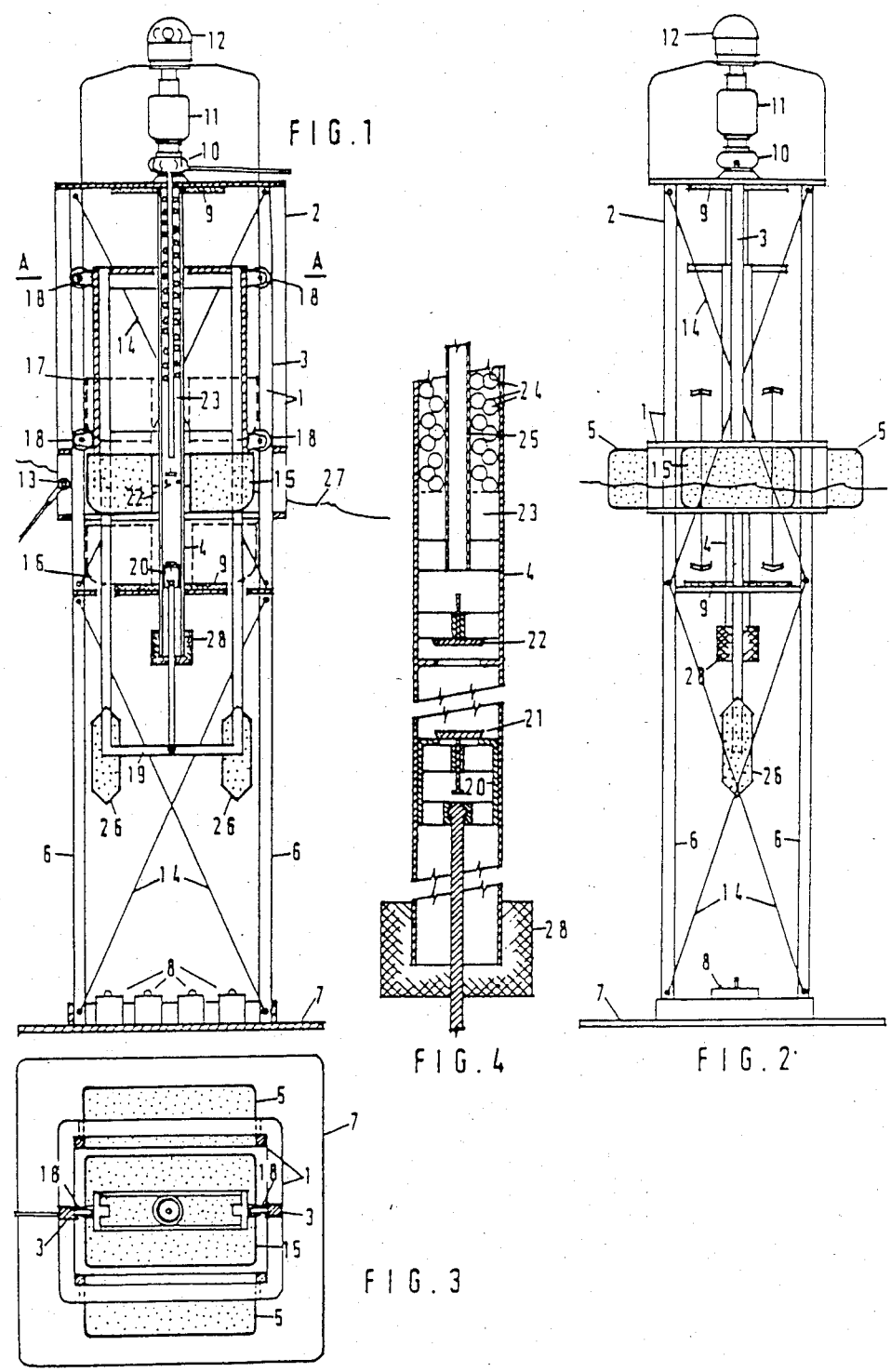

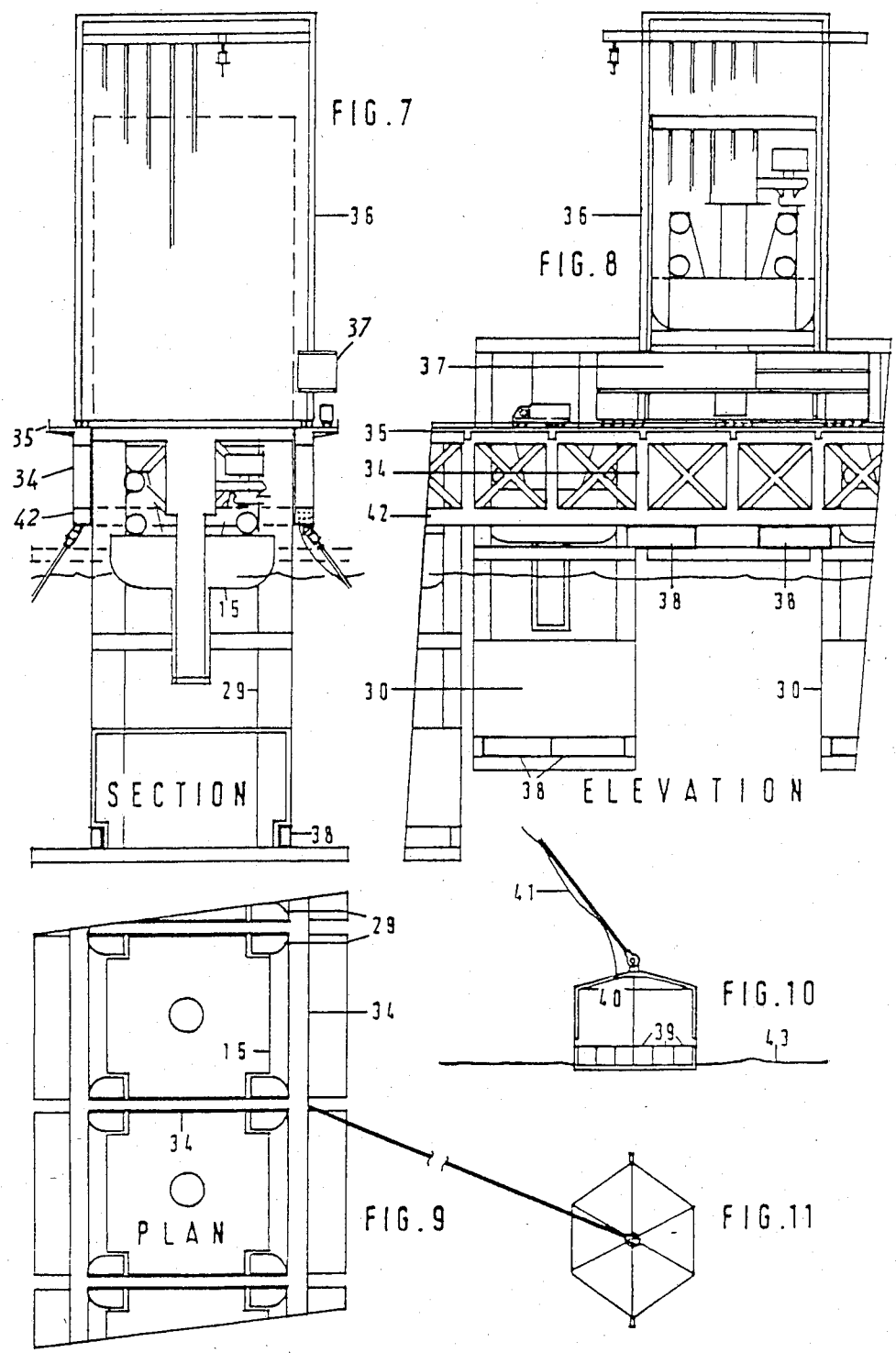

WAVE POWER CONVERTER

TECHNICAL FIELD

This invention relates to floating hydraulic machines which convert the natural energy of wind-generated water waves into useful power.

BACKGROUND ART

Energy can be obtained from waves by various means, such as utilising the changing wave height, underwater pressure variations, sub-surface fluid particle motion, breading wave effects, and so forth. Many different kinds of devices have been proposed and experimented with during the last two hundred years, but few have achieved even a modest power output or have survived long in the water, because of the difficulty of designing machines which can be built with good output, low material content, high durability and low maintenance requirements, to function reliably in remote locations subject to extreme conditions of exposure to storms and marine corrosion.

"The Development of Wave Power—a Techno-Economic Study", by Leishman and Scobie, published by the National Engineering Laboratory, East Kilbride, Scotland, in 1975, lists British Patents on wave-powered devices from 1855, and illustrates typical concepts classified according to their means of operation, together with a list of organisations in various countries studying wave power, usually for the generation of electricity. Subsequent researchers up to the present time investigated various ideas (most of which are described in "Offshore Engineer—January 1981") and have participated with the Japanese in a full-scale trial at sea (the "Kaimei" barge experiment).

Systems which have merited serious study have generally, apart from a Swedish buoy example with mechanical power linkage, fallen into two groups, utilising either hydraulic or pneumatic intermediate stages to convert wave energy into motive power. Of the former, the "Salter Duck" and the "Cockerell Raft" have been demonstrated at reduced scale. Both proposals utilised hydraulic power generated by the opposition of hinged floats following the wave profile, but failed to attain reasonable cost/output ratios and have been abandoned. A generally-favoured, but questionable view today is that pneumatic conversion machines, which use wave motion to force air through turbines, are the most practical. This opinion is largely based on the success of small air-turbine-powered navigation light buoys produced by the Japanese Ryokuseisha Corporation, but ignores the failure of the Japanese "Kaimei" barge experiment which utilised air turbines over "wave-piston" air compartments.

Other proposed machines based on similar air displacement principles include the "Lancaster Bag", the National Engineering Laboratory's "Oscillating Water Column", the "Vickers Device", and the "Lanchester Clam". Disadvantages of these devices utilising air-driven turbines are:

(1) Low mass and low kinetic energy of the air fluid flow to the turbines.

(2) Flow pressure to an air turbine of given size depends only on the incident wave magnitude—it does not increase with air chamber or bellows volume. Consequently, the larger the air compartment, the greater the mechanical disadvantage and the more adverse the cost/benefit ratio.

(3) The compressibility of the air fluid medium absorbs and reduces input energy.

(4) Pulsating or reciprocating air flow leads to unavoidable inertia losses.

(5) Because of these inherent drawbacks, air-driven machines will only function effectively within narrow design limits.

(6) Having substantial mass and strong compartments in order to withstand wave impact, they tent to be large and costly structures in relation to the power generated.

SUMMARY OF THE INVENTION

The present invention avoids these limitations by efficiently utilising the Archimedean uplift of a float by wave action to raise water into a strong pressurised compartment, from which it is released to provide hydraulic power for turbines, propulsion, or other uses. The complete assembly, before adding ballast, is of minimal weight and material content and therefore low in cost. Water under high pressure is the most suitable fluid for efficient power delivery. The output is, furthermore, continuous and not intermittent, because of the resilience of the controllable pressure water storage arrangements.

A constrained buoy or float, (called the motivator buoy), which may have supplementary buoyancy means below water level to reduce its surface displacement and increase its sensitivity to wave effects, reciprocates vertically within guides, is alternately floating in the wave troughs and then partially submerged in the wave peaks, and lifts a hydraulic piston at a lower level raising water from below the wave surface into a pressurised water storage compartment via automatic non-return valves, thence turning one or more water turbines arranged to drive electricity generators.

The hydraulic piston may be rigidly attached to and axially concentric with the motivator buoy, in order to avoid the complexities and additional wear of hinged linkages or oscillating connecting rods. A water inlet valve may be conveniently located in the head of the hollow piston, and a non-return pressurised water valve may be positioned at calm water level above the maximum upward piston stroke position in the hydraulic cylinder barrel. The cylinder barrel may continue upwards through the centre of the motivator buoy, and be connected with the pressurised water storage compartment above.

The floating buoy and its connected piston forms one of two floating components of the assembly, the other component (called the floating platform) being designed to be as little affected as possible by wave motion, to support or carry guides, sliding members, wheels or rollers controlling and aligning the vertical movement of the floating buoy, framework to support and hold the hydraulic cylinder barrel axially positioned in relation to the moving piston, and to carry the pressurised water storage compartment, hydraulic pipes, water turbines, valves, compressor, generators and necessary control gear on a platform at or above water level.

The storage compartment incorporates a compressible medium, such as that afforded by an airspace, the air being compressed by the incoming water until the desired operating pressure is reached and a water flow valve to the turbine is opened. Additional turbines, brought into operation with their connected generators as required, may be provided to cope with peak power conditions. The air supply can be replenished by an air compressor. For small machines, the compressible medium may simply comprise closed cell sponge rubber, or air-filled flexible capsules, which overcomes the problem of air dissolving into and being carried away by the water flow, and the consequent requirement for a replenishment air compressor.

Turbine power output depends on flow quantity, mass and velocity, which factors vary according to the input flow pipe size, fluid medium, and pressure head. For this reason, wave power converters with power take-off from a constant high pressure water supply are much more effective than those utilising intermittent low pressure air flow and an air turbine. The maximum equivalent head of water in meters (m) held in the storage compartment depends on the ratio $$\frac{\text{motivator buoy displacement (m}^3\text{)}}{\text{hydraulic cylinder area (m}^2\text{)}}.$$

Thus, where $m^3 = 1000$ and $m^2 = 3.33$, $m = 300$ meters, and this pressure head value holds good for the same buoy displacement/cylinder area ratio, whatever the size of machine. The desired pressure ratio is limited only by the pressure-resisting capacity of materials to be used.

The pressurised water may also be used for purposes other than electricity generation, such as propulsion or positioning by water jet thrust of the floating wave power converter assembly or structure, or for distillation of fresh water from sea-water by the "reverse osmosis" method.

The floating platform has one or more supporting columns or pillars, which may be tubular and designed to be buoyant, extending downwards from above wave level to a depth below water where there is negligible water movement due to wave motion, even in storm conditions. A heavy base slab or box (called the baseplate) of large horizontal area attached to the lower end of the column or columns, because of its low centre of gravity, maintains the floating platform in a substantially upright position and also functions as a sheet-anchor, stabilising the structure and minimising up and down movement due to wave action. The baseplate may be hollow in order to contain variable amounts of ballast such as cast iron, and may be box-shaped with provision for admitting compressed air displacing water in order to adjust the weight, buoyancy, and ballasting effect of the baseplate, to suit the size and frequency of the waves, to vary the reaction afforded by the floating platform to the upthrust of the power-generating piston, and to assist in raising the assembly for maintenance purposes.

Where it is desirable to avoid the complication of providing compressed air facilities to continuously vary the ballast weight, for instance, for small machines suitable for navigation buoys, and portable electricity generators for moored boats, the floating platform may have, instead of buoyant columns and variable buoyancy baseplate, a baseplate with fixed weight ballast at low level, non-buoyant columns and one or more rigidly attached floats at water level, positioned so that the required calm water flotation level of the ballasted floating platform coincides with approximately half the float displacement. The motivator buoy piston upthrust tends to raise the floating plateform to a greater or lesser extent depending on wave conditions, and the consequently varying displacement of the fixed floats is self-compensating, increasing or reducing the effective ballast load to provide an appropriate reactive force. This effect is enhanced if the fixed floats are of large horizontal area rather than depth, but the principle is best suited to small individual wave power generators, because the fixed floats must surround or adjoin the motivator float, affecting to some extent the free wave motion in the vicinity of the device—this is a disadvantage where a continuous array of machine modules is required, as in large power installations.

For continuous arrays, buoyant columns are desirable, with compressed air ballast load adjustment for each machine. Buoy modules may be connected, and linked by an above-water framework to build up the required power output, provide great mass and inertial stability, and afford means of access and maintenance facilities. Constructions may be floated out into position but, ideally, linked to the shore in the manner of piers or jetties, extending far out to sea and even joining islands to the mainland. Access is thus made easy, but the main advantage is avoidance of underwater power cables, which are easily damaged by ships' anchors and fishing gear, prone to undersea deterioration and difficult to inspect.

Inspection and repair provisions are most important for any continuously operating machine system, especially in an exposed hostile environment. In a large array of converters, steel parts of the assembly are protected against corrosion by galvanising, marine petrolatum tape or other special coatings and every part of the structure, moorings and working apparatus is accessible and replaceable without special equipment, diving operations or interruption of main power output. Workshops with staff accommodation can be provided on the stable connecting framework, comparable with oil or gas rig facilities but without the hazards of helicopter access. To inspect underwater parts of any module, the hydraulic piston, valves and cylinder, or the motivator buoy, the module is electrically and hydraulically disconnected and mechanically unlocked from its neighbours, then pneumatically elevated to the desired height within the connecting framework by "blowing" its below-water ballast tank. Furthermore, by partially raising the module in this way, and re-locking to adjoining modules, these may be used, with their additional buoyancy, to lift the module completely clear of the water, to inspect and maintain its fully exposed baseplate and ballast compartment.

Mooring is effected by applying the same principle of pneumatic displacement to heavy submersible hollow ballasted caissons which by their weight act as anchors and are flooded with water and sunk to the sea bed, or raised as required by filling with compressed air, being attached to the floating structure by flexible hawser. Wave impulse forces on moored wave energy converters as described, even in storm conditions, are unlikely to be damaging because they are absorbed by the great inertia of the floating plateform or connected array, the resilience of the motivator buoys and the cushioning effect of the pressurised water storage means—there are not recurrent shock loads on mooring attachments.

Arrays of wave energy converters can be positioned to any required layout, and will accept wave energy from any direction.

BRIEF DESCRIPTION OF DRAWINGS

The accompanying drawings show examples of applications of the invention, with details of the various related parts:

FIGS. 1 and 2 are side and end views of a small wave power converter suitable for a floating electric navigation buoy or yacht generator.

FIG. 3 is a plan of the same converter at A—A on FIG. 1.

FIG. 4 illustrates the hydraulic piston and cylinder, non-return valves and pressurised water compartment, to a larger scale.

FIGS. 7 and 8 are diagrammatic sectional and side elevational views of a connected assembly of large wave power converter modules.

FIG. 9 is a part plan of the same assembly.

FIGS. 10 and 11 show sectional and plan views respectively of heavy caissons acting as mooring anchors on the sea bed.

MODES FOR CARRYING OUT THE INVENTION

Figure 5:
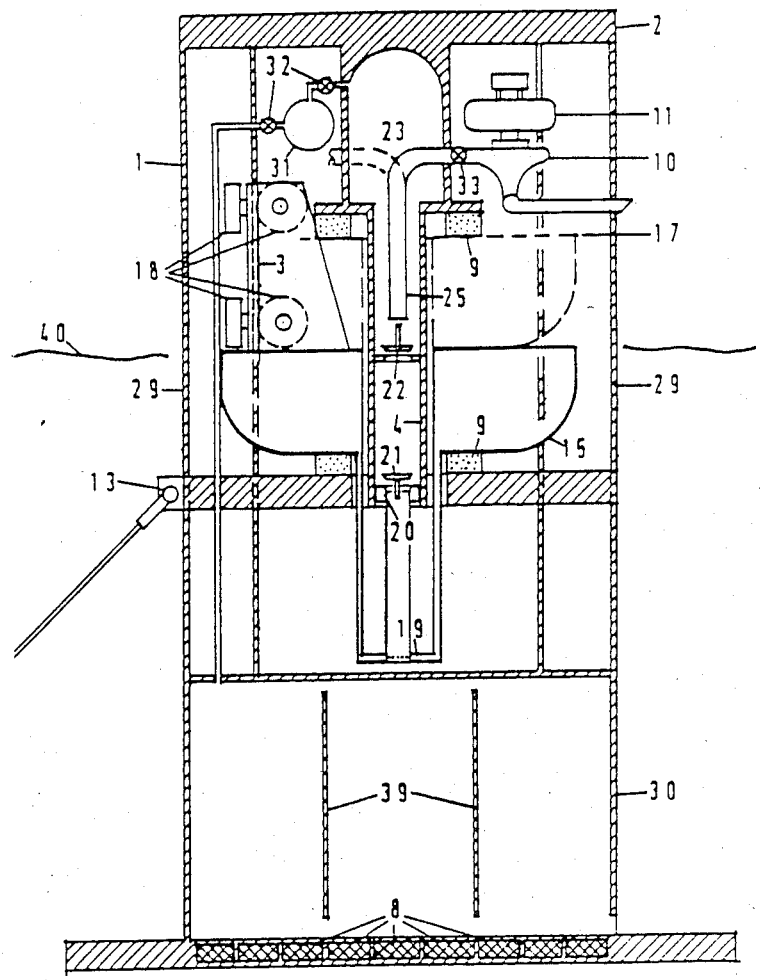
FIGS. 5 and 6 show the schematic section and plan of a large wave power converter module.

Referring to the drawings, FIGS. 1 to 4, the floating platform assembly 1 has a superstructure 2 carrying wheel guides 3, and supporting the hydraulic cylinder 4, fixed floats 5 at water level, and frame members 6 extending downwards to a flat plate 7 below the wave influence zone. Ballast weights 8 rest on the flate plate.

Absorbent buffer pads 9 limit the travel of the motivator buoy assembly in extreme conditions.

The top of the superstructure carries a water turbine 10, electricity generator 11 and navigation beacon 12 (if required).

A mooring cable is attached at a point 13 near static water level best suited to maintain equilibrium.

Bracing wires 14 prevent distortion of the lightweight framework of the floating platform.

The motivator buoy 15 is shown at mid-point in its vertical travel as a wave 27 travels from left to right in FIG. 1. The buoy reciprocates vertically in the waves between its lowest point, shown by the broken outline 16 (in the wave trough) and its highest point 17 (the wave peak) aligned by its guide wheels 18, and suspending a yoke 19 supporting and lifting a hydraulic piston 20 in the hydraulic cylinder barrel 4.

In FIG. 4, the hollow piston 20 has in its head an automatic non-return valve 21 which opens on the down-stroke to admit water to the cylinder barrel via a water filter 28, then closes on the up-stroke as the non-return valve 22 at static water level in the cylinder barrel opens to admit water to the pressurised water space 23, which in this illustration comprises an annular compartment filled with compressible capsules 24 surrounding the tube 25 delivering pressurised water to the turbine 10.

Supplementary buoyancy means 26 attached to the yoke 19 reduce the self-weight surface displacement of the motivator buoy 15 and increase its sensitivity to wave action.

Figure 6:
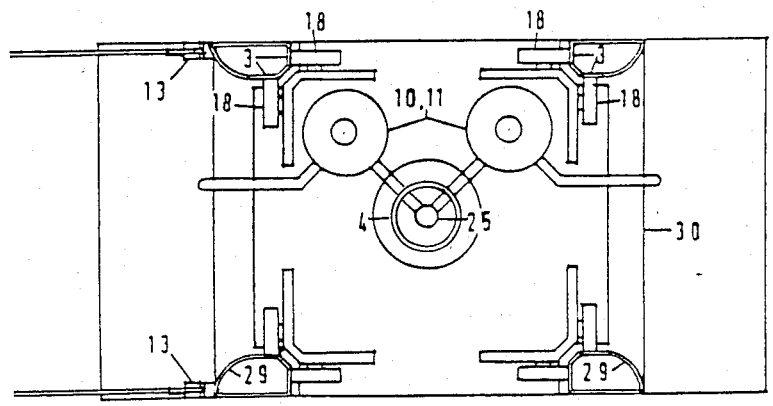

The large wave power converter shown in FIGS. 5 and 6, also in an array of modules, FIGS. 7, 8 and 9, has corresponding parts numbered the same way as in the small converter (FIGS. 1–4), namely, the floating platform assembly 1, superstructure 2, wheel guides 3, hydraulic cylinder 4, and ballast 8.

Calm water level is indicated at 40, and instead of fixed floats, this machine has buoyant tube columns 29, also a hollow, box-shaped water-filled baseplate 30 with internal surge baffle plates 39, iron ballast 8, and provision for admitting or releasing air using a compressor 31 to vary the buoyancy of the floating platform.

Other components are float travel limit buffers 9, water turbine 10, generator 11, mooring cable attachment 13, motivator buoy 15 shown at its lowest point with its highest point 17 indicated. Guide wheels 18 (shown one side only) control vertical movement of the buoy, and the suspended yoke 19 lifts the hollow piston 20 with its non-return valve 21. Water is forced through the upper non-return valve 22 into the pressurised water compartment 23, and thence via the delivery tube 25 to the turbine 10. Control valves 32 and 33 regulate air pressure and water flow respectively.

FIGS. 7, 8, 9, 10 and 11 illustrate diagrammatically a connected array of converters and preferred methods of mooring and maintaining the component structures, An above-water connecting framework 34 has provision for an access roadway 35 and also carries a travelling maintenance enclosure 36 with crane, workshops and accommodation facilities 37.

To inspect underwater parts of any module, and raise the working machinery into the warm, illuminated maintenance enclosure, the module is, with the assistance of adjoining modules temporarily attached to it by means of sliding locking members 38, raised by filling the hollow box baseplates 30 with compressed air.

Electricity cables may conveniently be housed in hollow box sections 42 of the connecting framework.

The heavy anchor caisson 40 shown in section and plan in FIGS. 10 and 11 is, like the hollow box baseplates of the converters, weighted with ballast 39 to sit on the sea-bed 43, but may be refloated for maintenance or repositioning by filling its flooded interior with compressed air via the airline 41.

INDUSTRIAL APPLICABILITY

The invention is a method of harnessing the power of ocean waves for producing electricity, or hydraulic power for other uses.

It is suitable for development in many forms, from small machines for yacht battery chargers and navigation light buoys, light vessels and lighthouses, to larger versions for supplying electricity to coastal communities and islands.

Bigger arrays will produce power for national power networks, for industrial and chemical processes and synthesis of hydrocarbon fuels, and may, as an incidental benefit, provide floating bridge links between islands and continents.

A version directly utilising hydraulic jet thrust may from the basis of a new concept of silent marine propulsion, using the great force of wavepower to propel the special craft on any course regardless of wind or wave direction.

I claim:

1. A wave power converter for producing energy comprising:
   (a) a relatively static floatable platform for floating in water;
   (b) a floating motivator buoy, said motivator vertically reciprocating relative to said platform in response to passing waves in said water;
   (c) a pump, said pump comprising:
      (i) a cylinder barrel mounted to said platform;

(ii) a slidable piston, said piston reciprocating in said barrel with the movement of said motivator buoy;

(iii) a water inlet located below water level, said inlet having a first non-return valve to allow water into said pump on the downward movement of said motivator buoy; and, (iv) a water outlet located above water level, said outlet having a second non-return valve for discharging water from said pump on the upward movement of said motivator buoy;

(d) an above-water pressurized container coupled to said water outlet, said container being partially filled with a compressible medium;

(e) a water powered turbine coupled to said container, said container supplying pressurized water to said turbine;

(f) a submersible hollow ballasted caisson anchored to said platform; and, (g) means for filling said caisson with air so as to raise said caisson.

2. A wave power converter as recited in claim 1 wherein said compressible medium is air filled capsules.

3. A wave power converter as recited in claim 1 wherein said motivator buoy includes a below water dependent yoke attached to said slidable piston, said yoke pushing water vertically into said cylinder barrel as said motivator moves upward in response to a passing wave.

4. A wave power converter as recited in claim 1 wherein said pressurized container has a connection for water entry at the underneath of said container so as to prevent the loss of air located in said container above said water level.

5. A wave power converter as recited in claim 1 wherein a delivery tube is positioned proximate the bottom of said pressurized container to deliver pressurized water to said turbine, said turbine being located above water level.

6. A wave power converter as recited in claim 1 wherein multiple converters are positioned proximate one another to form an array, said array means for raising a selected power converter relative to the remaining power converters.

7. A power converter as recited in claim 6 wherein said raising means comprises a below water level hollow baseplate, said baseplate being filled with air to raise said converter, and said baseplate having means for releasing said air inside said baseplate.

8. A wave power converter for producing energy, comprising:

(a) a relatively stable floatable platform for floating in water, said platform having buoyancy means at water level and ballast means extending below said water level, said ballast means being hollow and having means for charging and discharging said ballast means with air so as to vary the effective weight of said ballast means;

(b) a floating motivator buoy, said motivator being vertically reciprocable relative to said platform in response to passing waves in said water;

(c) a pump comprising:
(i) a cylinder barrel mounted to said platform;
(ii) a slidable piston, said piston being vertically reciprocable in said barrel with the movement of said motivator buoy;
(iii) a water inlet located below said water level, said inlet having a first non-return valve to allow water into said pump on the downward movement of said motivator buoy; and,
(iv) a water oulet located above said water level, said outlet having a second non-return valve for discharging water from said pump on the upward movement of said motivator buoy;

(d) an above-water pressurized container coupled to said water outlet, said container being partially filled with a compressible medium; and, (e) a water-powered turbine coupled to said container, said container supplying pressurized water to said turbine.

9. A wave power converter as recited in claim 8 further comprising a submersible hollow ballasted caisson, said caisson being anchored to said platform and having means for filling said caisson with air.

10. A wave power converter as recited in claim 8 wherein said compressible medium is air-filled capsules.

11. A wave power converter as recited in claim 8 wherein said motivator buoy includes a below water dependent yoke attached to said slidable piston, said yoke pushing water vertically into said cylinder barrel as said motivator moves upward in response to a passing wave.

12. A wave power converter as recited in claim 8 wherein said pressurized container has a connection for water entry at the underneath of said container so as to prevent the loss of air located in said container above water level.

13. A wave power converter as recited in claim 8 wherein a delivery tube is positioned proximate the bottom of said pressurized container to deliver pressurized water to said turbine, said turbine being located above water level.

14. A power converter as recited in claim 8 wherein multiple converters are positioned proximate one another forming an array, said array having means for raising a selected power converter relative to the remaining power converters.

15. A power converter as recited in claim 14 wherein said raising means comprises a below-water-level hollow baseplate, said baseplate being filled with air to raise said converter, and said baseplate having means for releasing said air inside said baseplate.

* * * * *